(12) United States Patent
Ernst et al.

(10) Patent No.: US 8,582,882 B2
(45) Date of Patent: Nov. 12, 2013

(54) UNIT FOR AND METHOD OF SEGMENTATION USING AVERAGE HOMOGENEITY

(75) Inventors: Fabian Edgar Ernst, Eindhoven (NL); Christiaan Varekamp, Eindhoven (NL)

(73) Assignee: Koninklijke Philipse N.V., Eindhoven (NL)

( * ) Notice: Subject to any disclaimer, the term of this patent is extended or adjusted under 35 U.S.C. 154(b) by 1002 days.

(21) Appl. No.: 10/503,424

(22) PCT Filed: Jan. 23, 2003

(86) PCT No.: PCT/IB03/00186
§ 371 (c)(1),
(2), (4) Date: Aug. 3, 2004

(87) PCT Pub. No.: WO03/067868
PCT Pub. Date: Aug. 14, 2003

(65) Prior Publication Data
US 2005/0129312 A1 Jun. 16, 2005

(30) Foreign Application Priority Data
Feb. 6, 2002 (EP) .................................... 02075493

(51) Int. Cl.
*G06K 9/34* (2006.01)
(52) U.S. Cl.
USPC .......................................... 382/173; 382/300
(58) Field of Classification Search
USPC ........................................................ 382/173
See application file for complete search history.

(56) References Cited

U.S. PATENT DOCUMENTS

| | | | | |
|---|---|---|---|---|
| 6,240,211 B1* | 5/2001 | Mancuso et al. | ............... | 382/236 |
| 6,252,974 B1* | 6/2001 | Martens et al. | ............... | 382/107 |
| 6,473,461 B1* | 10/2002 | Wang | ....................... | 375/240.16 |
| 6,625,333 B1* | 9/2003 | Wang et al. | .................... | 382/300 |
| 6,853,753 B2* | 2/2005 | Kimoto | ........................ | 382/236 |
| 7,120,277 B2* | 10/2006 | Pelagotti et al. | ............. | 382/107 |
| 7,245,782 B2* | 7/2007 | Le Meur et al. | .............. | 382/275 |
| 8,045,812 B2* | 10/2011 | Friedrichs et al. | ............ | 382/236 |
| 2002/0076103 A1* | 6/2002 | Lin et al. | ....................... | 382/173 |
| 2002/0180870 A1* | 12/2002 | Chen | ......................... | 348/207.1 |
| 2002/0196362 A1* | 12/2002 | Yang et al. | .................... | 348/452 |
| 2003/0007667 A1* | 1/2003 | Ernst et al. | .................... | 382/107 |
| 2003/0035583 A1* | 2/2003 | Pelagotti et al. | ............. | 382/217 |
| 2003/0194151 A1* | 10/2003 | Wang et al. | .................... | 382/300 |

(Continued)

OTHER PUBLICATIONS

I. Grinias et al, "A semi-automatic seeded region growing algorithm for video object localization and tracking", Signal Processing: Image Communication, vol. 16, No. 10, Aug. 2001.

(Continued)

*Primary Examiner* — Gandhi Thirugnanam

(57) ABSTRACT

A segmentation unit included an assignment unit configured to assign a first pixel of a first image of a sequence of images to a segment comprises an assignment unit, and to assign a first homogeneity value to the first pixel on basis of the first image. An averaging unit is configured to calculate an average homogeneity value for the first pixel by averaging the first homogeneity value and a second homogeneity value being determined for a second pixel of a second image of the sequence of images. The first and second pixels are related by a motion vector. A comparing unit is configured to compare the average homogeneity value with a threshold in order to assign the first pixel to the segment.

11 Claims, 4 Drawing Sheets

(56) References Cited

U.S. PATENT DOCUMENTS

Figure 1:
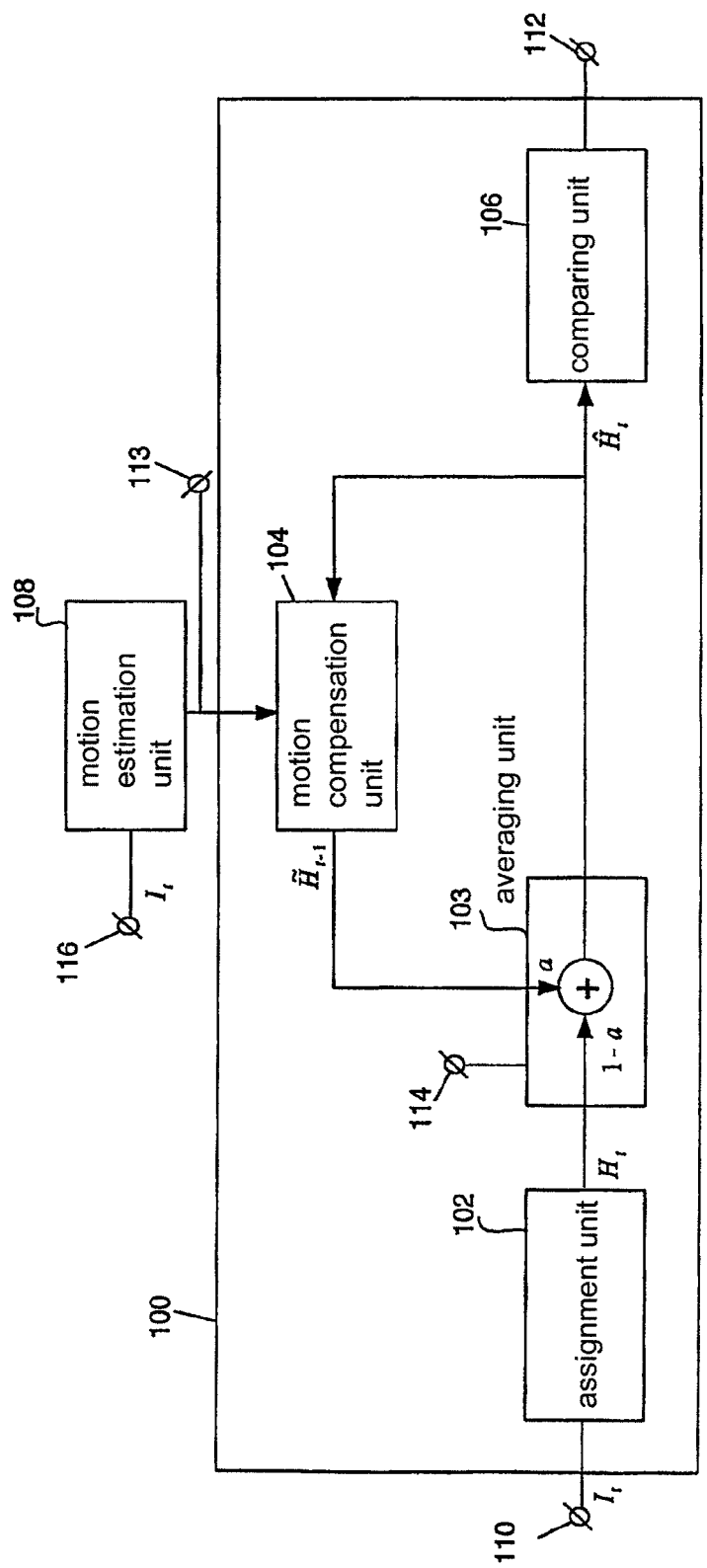

| | | | |
|---|---|---|---|
| 2005/0147170 A1* | 7/2005 | Zhang et al. | 375/240.16 |
| 2005/0264692 A1* | 12/2005 | Hoshino et al. | 348/452 |
| 2006/0110038 A1* | 5/2006 | Knee et al. | 382/173 |
| 2008/0107307 A1* | 5/2008 | Altherr | 382/107 |
| 2009/0060359 A1* | 3/2009 | Kim et al. | 382/236 |
| 2010/0271554 A1* | 10/2010 | Blume | 348/699 |
| 2010/0328532 A1* | 12/2010 | Wu et al. | 348/500 |
| 2013/0011020 A1* | 1/2013 | Kamoshida et al. | 382/107 |

OTHER PUBLICATIONS

"Spatio-Temporal Video Segmentation Using a Joint Similarity Measure" by J.G. Choi et al., in IEEE Transactions on Circuits and Systems for Video Technology, vol. 7, No. 2, Apr. 1997.

* cited by examiner

UNIT FOR AND METHOD OF SEGMENTATION USING AVERAGE HOMOGENEITY

The invention relates to a segmentation unit for assigning a first pixel of a first image of a sequence of images to a segment.

The invention further relates to a method of assigning a first pixel of a first image of a sequence of images to a segment.

The invention further relates an image processing apparatus comprising:
  receiving means for receiving a sequence of images;
  a segmentation unit for assigning a first pixel of a first image of the sequence of images to a segment; and
  an image processing unit controlled by the segmentation unit.

Segmentation is an essential step in numerous image processing and pattern recognition tasks. Segmentation is a process of deciding, for pixels in an image, membership to one of a finite set of segments, where a segment is a connected collection of pixels. Membership can be decided on the basis of color, luminance, texture, or other attributes. The measure of correspondence between pixels is called homogeneity. Usually, the intended meaning of a segment is "the projected image of an object in the scene".

For compression, depth or motion estimation, object tracking or other purposes of video segmentation, a segmentation process should ideally fulfill the following two requirements:
  The segmentation should be at least pixel accurate; and
  The segmentation should be stable in time: it should be possible to "track" segments as long as they are visible in the image. In fact, segments should ideally "move along" with the scene and the profile of their shape should not vary too much. Small changes in the image due to the noise, but also occlusions, zooming and different viewing angles should not result in sudden changes in the shape of segments. This avoids artifacts such as flickering after processing of the video streams.

One can think of two extremes which each satisfy only one requirement:
  An accurate segmentation of each frame separately. This segmentation might be pixel-accurate, but due to noise or other reasons the segmentation is usually not stable in time, i.e. there is no one-to-one correspondence between subsequent images.
  One frame is segmented, and these segments are kept throughout subsequent images forming the scene, for instance by shifting or deforming them. This guarantees stability, but can not handle new objects coming into the scene at a later stage.

An embodiment of the method of the kind described in the opening paragraph is known from the article "Spatio-Temporal Video Segmentation Using a Joint Similarity Measure" by J. G. Choi et al., in IEEE Transactions on Circuits and Systems for Video Technology, vol. 7, no. 2, April 1997. This article describes a morphological spatio-temporal segmentation algorithm. The algorithm incorporates luminance and motion information simultaneously and uses morphological tools such as morphological filters and a watershed algorithm. The procedure towards complete segmentation consists of three steps: joint marker extraction, boundary decision, and motion-based region fusion. First, the joint marker extraction identifies the presence of homogeneous regions in both motion and luminance, where a simple joint marker extraction technique is proposed. Second, the spatio-temporal boundaries are decided by the watershed algorithm. For this purpose, a joint similarity measure is proposed Finally, an elimination of redundant regions is done using motion-based region fusion. The core of the algorithm is the joint similarity measure for the morphological spatio-temporal segmentation. The joint similarity measure for spatio-temporal segmentation is the weighted sum of the intensity difference plus the motion difference. It is defined as similarity:

$$\text{Similarity} = \beta(\text{intensity difference}) + (1-\beta)k \text{ motion difference} \quad (1)$$

where is k a scaling factor and $\beta$ is a weighting factor. The weighting factor allows more importance to be given to the intensity difference or to the motion difference. The intensity difference is the gray tone difference between the pixel under consideration and the mean of the pixels that have already been assigned to the region. The motion difference is the motion error between the estimated motion vector at pixel (x, y) and the motion vector generated at pixel (x, y) by a motion model of the region. By incorporating spatial and temporal information simultaneously visually meaningful segmentation results can be obtained. However the algorithm does not perform well in the case that new objects come into the scene, i.e. it is not time stable.

It is an object of the invention to provide a segmentation unit of the kind described in the opening paragraph which is arranged to make a pixel accurate segmentation which is relatively time stable.

The object of the invention is achieved in that the segmentation unit for assigning a first pixel of a first image of a sequence of images to a segment comprises:
  an assignment unit for assigning a first homogeneity value to the first pixel on basis of the first image and a second homogeneity value to a second pixel of a second image of the sequence of images, with the first pixel and the second pixel related by means of a motion vector;
  an averaging unit for calculating an average homogeneity value for the first pixel by means of averaging the first homogeneity value and the second homogeneity value; and
  a comparing unit for comparing the average homogeneity value with a threshold in order to assign the first pixel to the segment.

An important aspect of the invention is that the decision, whether the first pixel belongs to the segment or not, is based on an average homogeneity value which is calculated on basis of pixels of multiple images. The relation between pixels of these multiple images is defined by the motion vector, being determined for the images to which these multiple pixels belong. The motion vector corresponds with the shift of a portion of an object in a time interval between capturing the images for which the motion vector is applicable. In the segmentation method according to the prior art a homogeneity value is calculated based on pixels of one image: the intensity difference is the gray tone difference between the pixel under consideration and the mean of the pixels that have already been assigned to the region. The advantage of using the average homogeneity value is that it provides time-stability, while still a pixel accurate segmentation can be made. In general, fluctuations in the values of pixels from one images to the next image in a sequence of images, e.g. caused by noise, give rise to instabilities in segmentation. This is caused mainly by the thresholding step, i.e. comparing step. By using the average homogeneity value the effect of the fluctuations is reduced.

After the average homogeneity value has been calculated the comparing unit compares this average homogeneity value with a threshold. Depending on the type of homogeneity and on the type of segmentation, the first pixel is assigned to the segment if the average homogeneity value is above or below the threshold. The threshold might be a predetermined value. Preferably the threshold is calculated based on properties of the images to be segmented.

The assignment unit for assigning the first homogeneity value to the first pixel can be designed to calculate this value based on comparing luminance values or color values of pixels in the neighborhood of the first pixel, e.g. a variance value or a maximum operator or another nonlinear operator. However the luminance value or color value of a pixel might also be applied as a homogeneity value.

An embodiment of the segmentation unit according to the invention is arranged to calculate the average homogeneity value by also taking into account further homogeneity values of further images of the sequence. The advantage of this embodiment is that even more reduction of noise can be achieved. Preferably the segmentation unit is arranged to perform a recursive calculation of the average homogeneity value. This means that the average homogeneity value of a current image, e.g. the first image, is being calculated based on a homogeneity value related to this current image and an average homogeneity value being calculated for a previously calculated image. The advantage of a segmentation unit with a recursive approach is that relatively little memory is required to store further homogeneity values of further images.

In an embodiment of the segmentation unit according to the invention the averaging unit is arranged to calculate a weighted average homogeneity. For this purpose the averaging unit has an interface by which a weighting factor can be controlled. This weighting factor determines the ratio between the first homogeneity value and another homogeneity value in the weighted average homogeneity value. With another homogeneity value is meant e.g. the second homogeneity value or the further homogeneity values. The advantage of calculating a weighted average homogeneity value is that it allows to make a trade-off between a pixel accurate segmentation primarily based on a single image on the one hand and a time stable segmentation on the other hand based on multiple images.

An embodiment of the segmentation unit according to the invention is characterized in that the segmentation unit is arranged to control a weighting factor on a pixel base, with the weighting factor influencing the weighting for the calculation of the weighted average homogeneity value. The weighting factor might be fixed for a complete image. However, in the case that there is knowledge about the quality of the homogeneity value of a pixel in one of the images under consideration it is preferred that the averaging is adapted accordingly. With a quality indicator is also possible to indicate that there is no valid homogeneity value. This can e.g. happen in the case of occlusion of objects in the scene. e.g. the quality of a particular motion vector is a good indication for the quality of the homogeneity value of the corresponding pixel.

An embodiment of the segmentation unit according to the invention comprises a motion estimation unit for estimating the motion vector, with the motion estimation unit being controlled by the comparing unit. A motion estimation unit is required to provide motion vectors. In principle this might be any type of motion estimation unit, e.g. a block based motion estimation unit. But preferably the motion estimation unit is a segment based motion estimation unit. In this embodiment the output of the comparing unit, i.e. segments, are provided to the motion estimation unit in order to estimate relatively good motion vectors.

An embodiment of the segmentation unit according to the invention is characterized in comprising a motion estimation unit for estimating the motion vector and characterized in that the motion estimation unit is designed to control the weighting factor. As said above, the quality of motion vectors is an indication of the quality of the assigned homogeneity values. By providing indicators related to the quality of motion vectors to the averaging unit, the averaging unit is able to control the weighting factor.

Modifications of the segmentation unit and variations thereof may correspond to modifications and variations thereof of the method and of the image processing apparatus described.

Figure 2:
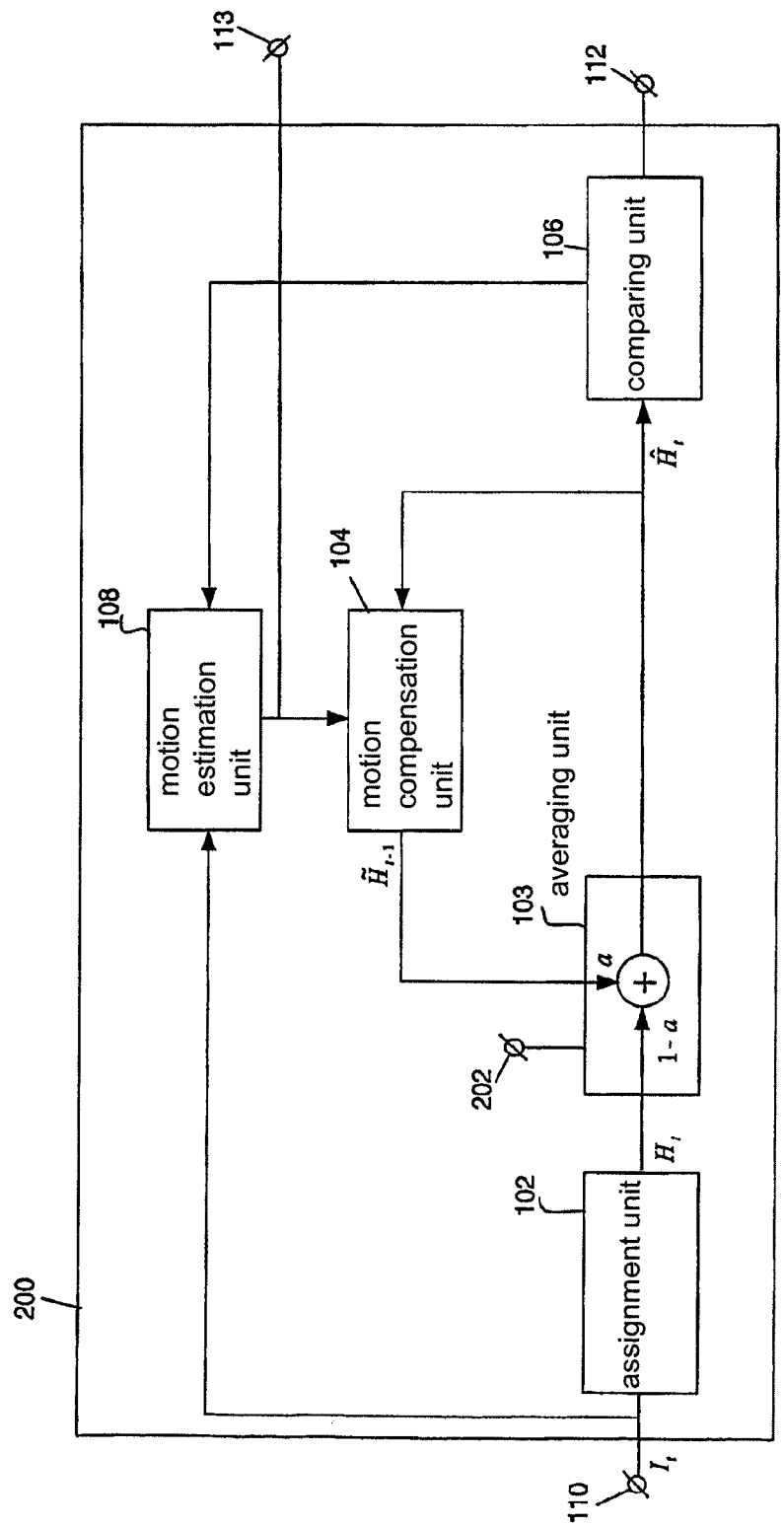
Figure 3:
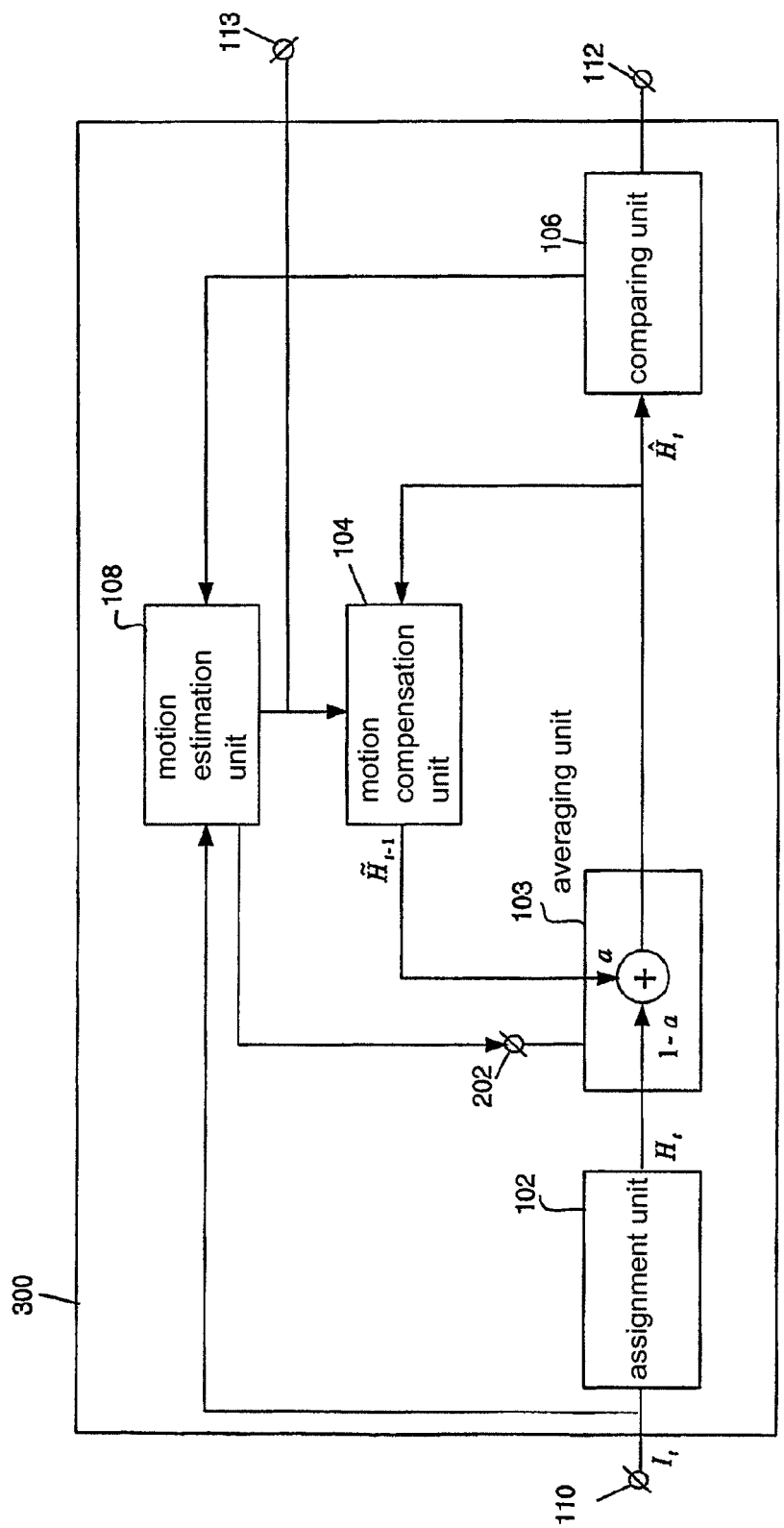
Figure 4:
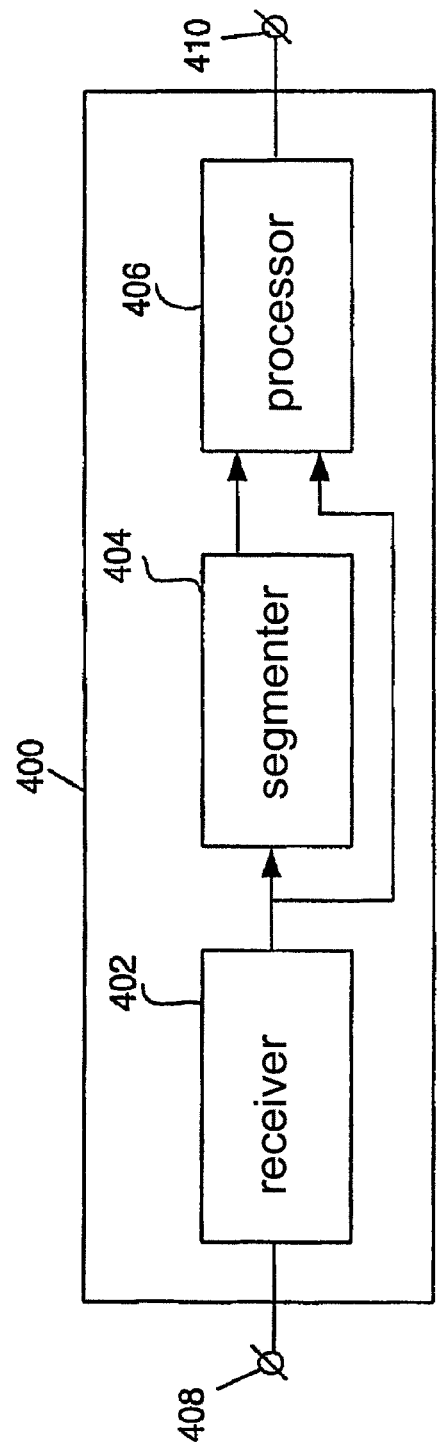

These and other aspects of the segmentation unit, of the method and of the image processing apparatus according to the invention will become apparent from and will be elucidated with respect to the implementations and embodiments described hereinafter and with reference to the accompanying drawings, wherein:

FIG. 1 schematically shows an embodiment of the segmentation unit according to the invention, arranged to calculate a weighted average homogeneity value;

FIG. 2 schematically shows an embodiment of the segmentation unit comprising a motion estimation unit being controlled by the comparing unit;

FIG. 3 schematically shows an embodiment of the segmentation unit with the averaging unit being controlled by the motion estimation unit; and FIG. 4 schematically shows an embodiment of the image processing apparatus according to the invention.

Corresponding reference numerals have the same meaning in all of the Figures.

FIG. 1 schematically shows an embodiment of the segmentation unit 100 according to the invention. The segmentation unit 100, for assigning a first pixel of a first image of a sequence of images to a segment, comprises:

- an assignment unit 102 for assigning a first homogeneity value to the first pixel on basis of the first image and a second homogeneity value to a second pixel of a second image of the sequence of images;
- a motion compensation unit 104 for motion compensation of a second image of the sequence of images;
- an averaging unit 103 for calculating a weighted average homogeneity value for the first pixel by means of averaging the first homogeneity value and the second homogeneity value; and
- a comparing unit 106 for comparing the average homogeneity value with a threshold in order to assign the first pixel to the segment.

A motion estimation unit 108 provides the motion compensation unit 104 with motion vectors. Optionally the segmentation unit 100 comprises the motion estimation unit 108.

First a mathematical description of the working of the segmentation unit will be provided. Second, the tasks of the separate units 102-108 will be described briefly by means of the steps which are successively made by the segmentation unit 100.

Let $H_t(x,y)$ denote the homogeneity value for image with index t at pixel position (x,y). In contrast with prior art segmentation methods the segmentation is not based on $H_t(x,y)$, but on a quantity $\hat{H}_t(x,y)$ which is defined in Equation 2:

$$\hat{H}_t(x,y) = \alpha \tilde{H}_{t-1}(x,y) + (1-\alpha) H_t(x,y) \tag{2}$$

where $\tilde{H}_{t-1}(x,y)$ is defined in Equation 3:

$$\tilde{H}_{t-1}(x,y) = H_{t-1}(x+\Delta x, y+\Delta y) \tag{3}$$

This means that for a particular pixel with coordinates (x,y) the motion compensated homogeneity value of the previous image and the homogeneity value of the current image are combined by means of calculating a weighted average.

Next, the tasks of the separate units 102-108 will be described briefly by means of the steps which are successively made by the segmentation unit 100. Images $I_{t-1}, I_t, I_{t+1}, I_{t+2}, \ldots$ are provided to the motion estimation unit 108 at the input connector 116 in order to calculate motion vectors. This gives for each pixel a motion vector $(\Delta x, \Delta y)$. The images $I_{t-1}, I_t, I_{t+1}, I_{t+2}, \ldots$ are also provided to the input connector 110 of the segmentation unit 100. The assignment unit 102 assigns to each of the pixels of $I_t$ a homogeneity value $H_t(x,y)$. Then the averaging unit 103 calculates a weighted average homogeneity value $\hat{H}_t(x,y)$ by means of averaging the homogeneity value $H_t(x,y)$ with a previously determined homogeneity value $\tilde{H}_{t-1}(x,y)$. The average homogeneity value $\hat{H}_t(x,y)$ is then provided to the comparing unit 106 for comparing the average homogeneity value with a threshold in order to assign the pixel with coordinates (x,y) to a particular segment. Optionally other segmentation steps are performed by the comparing unit 106, e.g. morphological operations, such as growing, erosion, dilatation. The segmentation result is a matrix of values indicating to which segment the corresponding pixels belong to. This segmentation result is provided at the output connector 112. The average homogeneity value $\hat{H}_t(x,y)$ is also provided to the motion compensation unit 104 in order to calculate $\tilde{H}_t(x,y)$, a motion compensated version of $\hat{H}_t(x,y)$ to be used for segmentation of succeeding images.

The averaging unit 103 comprises a control interface with connector 114 by means which an appropriate value of the weighting factor a can be provided. The value of $\alpha$ is between 0 and 1. In the case that $\alpha=0$ the homogeneity values of other images are not taken into account for the segmentation of the current image. In the case that $\alpha=1$ only the homogeneity values of other images are taken into account for the segmentation of the current image. Optionally this weighting factor $\alpha(x,y)$ is controlled on a pixel base. See FIG. 3. That means that Equation 2 should be rewritten to:

$$\hat{H}_t(x,y) = \alpha(x,y)\tilde{H}_{t-1}(x,y) + (1-\alpha(x,y))H_t(x,y) \qquad (4)$$

The motion estimation unit 108 optionally comprises an output connector 113 at which the motion vector are provided too. That means that by means of this output connector other units than the motion compensation unit 104 can access motion vectors. In connection with FIG. 4 it is described that these motion vectors can be applied externally to the segmentation unit 404.

FIG. 2 schematically shows an embodiment of the segmentation unit 200 comprising a motion estimation unit 108 being controlled by the comparing unit 106. In this embodiment according to the invention the motion estimation unit 108 is arranged to calculate motion vectors for segments which are defined by the segmentation unit 200. And vice versa, the segmentation unit 200 is arranged to calculate new segments based on motion vectors estimated by the motion estimation unit 108. Because of this mutual dependence an initial segmentation should be made based on a single image, without taking care of motion. Based on the segments found with this initial segmentation, motion vectors can be estimated for processing proceeding images. For the rest is the working of this segmentation unit 200 substantially the same as the working of the segmentation unit 100 as described in connection with FIG. 1.

FIG. 3 schematically shows an embodiment of the segmentation unit 300 with the averaging unit 103 being controlled by the motion estimation unit 108. The weighting is controlled on a pixel base, i.e. Equation 4 is applicable to this segmentation unit 300. The motion vectors are provided to the motion compensation unit 104 and the averaging unit 103. Besides that information about the motion vectors is provided to the averaging unit 103. With information is meant an indication about the quality of the motion vectors, e.g. the match errors of the motion vectors. If the quality of a particular motion vector is high then the value of the corresponding weighting factor $\alpha(x,y)$ could be set on a high value. However if the quality of a particular motion vector is low then the value of the corresponding weighting factor $\alpha(x,y)$ could be set on a low value.

FIG. 4 schematically shows an embodiment of the image processing apparatus 400 according to the invention. The image processing apparatus 400 comprises:

receiving means 402 for receiving a sequence of images. The received signal may be a broadcast signal received via an antenna or cable but may also be a signal from a storage device like a VCR (Video Cassette Recorder) or Digital Versatile Disk (DVD). The signal is provided at the input connector 408.

a segmentation unit 404 as described in connection with FIG. 1, FIG. 2 or FIG. 3; and an image processing unit 406 controlled by the segmentation unit 404.

The image processing unit 406 might be a video encoder, e.g. MPEG encoder. By having segmented an image, it is possible to encode some of the segments with a higher accuracy than other segments. This is advantageous in e.g. a video conferencing system where faces of persons are coded differently from the background.

Alternatively the image processing unit 406 might be arranged to perform a depth estimation. It is known that the steps of a method of motion estimation may be followed by a calculating step to obtain a method of depth estimation. The following problem is considered: given a sequence of images of a static scene taken by a camera with known motion, depth information should be recovered. All apparent motion in the sequence of images results from parallax. Differences in motion between one segment and another indicate a depth difference. Indeed, analyzing two consecutive images, the parallax between a given image segment at time t and the same segment at t+1 can be computed. This parallax corresponds to the motion of different parts of the scene. In the case of translation of the camera, objects in the foreground move more than those in the background. By applying geometrical relations, the depth information can be deduced from the motion. This concept is described by P. Wilinski and C. van Overveld in the article "Depth from motion using confidence based block matching" in Proceedings of Image and Multi-dimensional Signal Processing Workshop, pages 159-162, Alpbach, Austria, 1998.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A segmentation unit for assigning a first pixel of a first image of a sequence of images to a segment, comprising a processor configured to perform the acts of:
   receiving the first image and a second image;
   assigning a first homogeneity value to the first pixel on basis of the first image and a second homogeneity value to a second pixel of the second image of the sequence of images, the first pixel and the second pixel being related by a motion vector;
   setting a weighting factor to a high value when a quality of the motion vector is a high amount, and setting the weighting factor to a low value when quality of the motion vector is a low amount, wherein the high value is higher than the low value and the high amount is higher than the low amount;
   calculating a weighted average homogeneity value using the weighting factor in averaging the first homogeneity value and the second homogeneity value;
   comparing the weighted average homogeneity value with a threshold; and
   determining whether the first pixel belongs to the segment based on results of the comparng act.

2. A method of assigning a first pixel of a first image of a sequence of images to a segment, comprising the acts of:
   assigning a first homogeneity value to the first pixel on basis of the first image and a second homogeneity value to a second pixel of a second image of the sequence of images received by an assignment unit, the first pixel and the second pixel being related by a motion vector;
   setting a weighting factor to a high value when a quality of the motion vector is a high amount, and setting the weighting factor to a low value when a quality of the motion vector is a low amount, wherein the high value is higher than the low value and the high amount is higher than the low amount;
   calculating a weighted average homogeneity value using the weighting factor in averaging the first homogeneity value and the second homogeneity value;
   setting current weighting factor to a higher value than a previous value of a previous weighting factor when a current quality of a current motion vector is higher than a previous quality of a previous motion vector
   comparing the current weighted average homogeneity value with a threshold; and
   determining whether the first pixel belongs to the segment based on results of the comparing act.

3. An image processing a apparatus comprising a processor configured to perform the acts of:
   receiving a sequence of images including a first image and a second image;
   assigning a first pixel of the first image of the sequence of images to a segment;
   assigning a first homogeneity value to the first pixel on basis of the first image and a second homogeneity value to a second pixel of a second image of the sequence of images, the first pixel and the second pixel being related by a motion vector;
   setting a weighting factor to a high value when a quality of the motion vector is a high amount, and setting the weighting factor to a low value when a quality of the motion vector is a low amount, wherein the high value is higher than low value and the high amount is higher than the low amount;
   calculating a weighted average homogeneity vale using the weighting factor in averaging the first homogeneity value and the second homogeneity value;
   comparing the weighted average homogeneity value with a threshold; and
   determining whether the first pixel belongs to the segment based on results of the comparing act.

4. The image processing apparatus as claimed in claim 3, wherein the processor is configured to decode the sequence of images.

5. The image processing apparatus as claimed in claim 3, wherein the processor is configured to perform a depth estimation.

6. The segmentation unit of claim 1, wherein tie threshold is calculated based on properties of the sequence of images.

7. The segmentation unit of claim 1, wherein the first image is current image, and the second image is a previous image.

8. The method of claim 2, wherein the threshold is calculated based on properties of the sequence of images.

9. The method of claim 2, wherein the first image is a current image, and the second image is a previous image.

10. The image processing apparatus of claim 3, wherein the threshold is calculated based on properties of the images to be segmented.

11. The image processing apparatus, of claim 3, wherein the first image is a current image, and the second image is a previous image.

* * * * *